March 26, 1968     A. S. THOMPSON     3,375,030
JOINT CONSTRUCTION FOR DOORS, WINDOWS AND THE LIKE
Filed Nov. 6, 1964     2 Sheets-Sheet 1
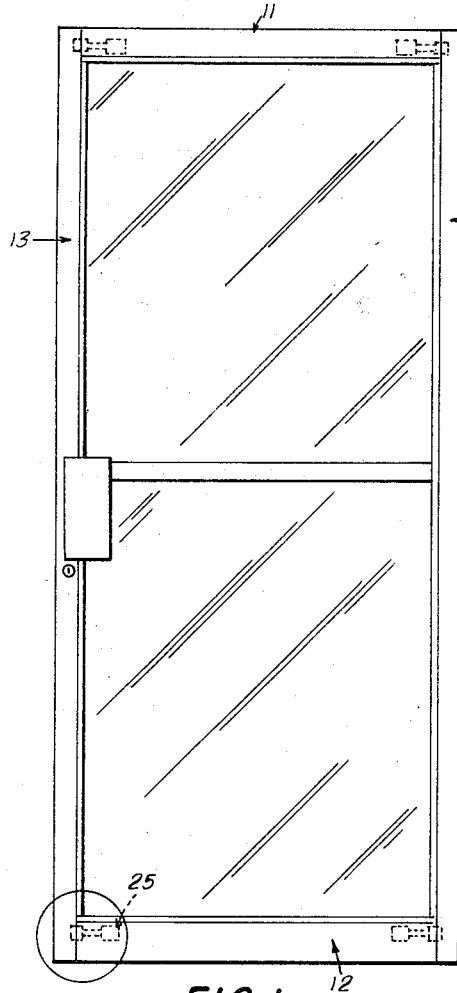
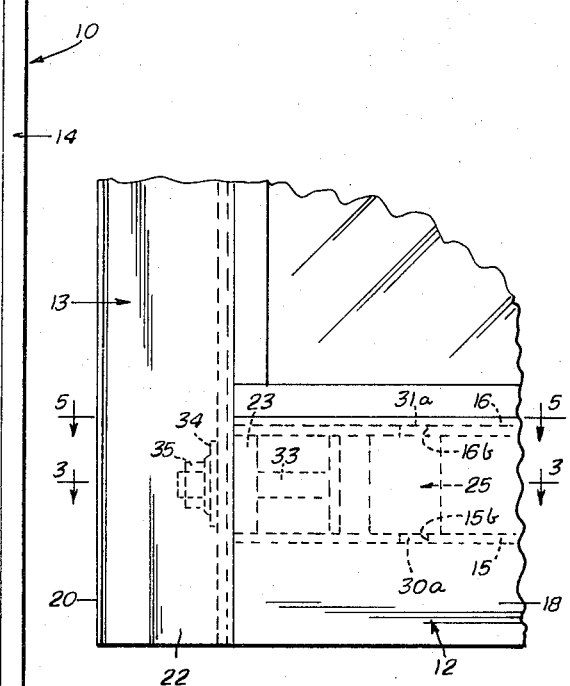
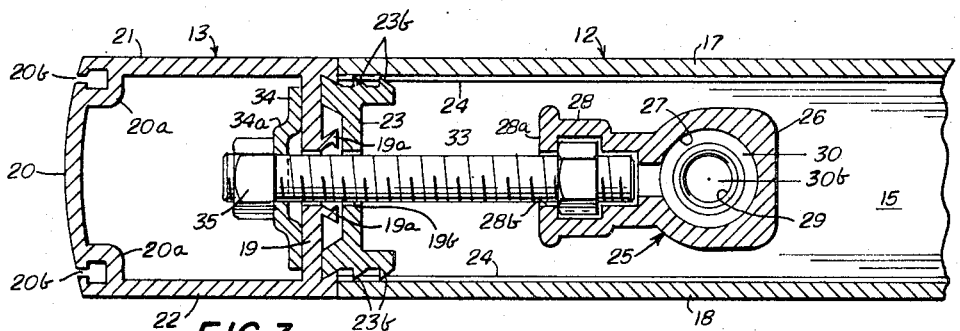
INVENTOR
ALEX S. THOMPSON
BY Beall and Jones
ATTORNEYS

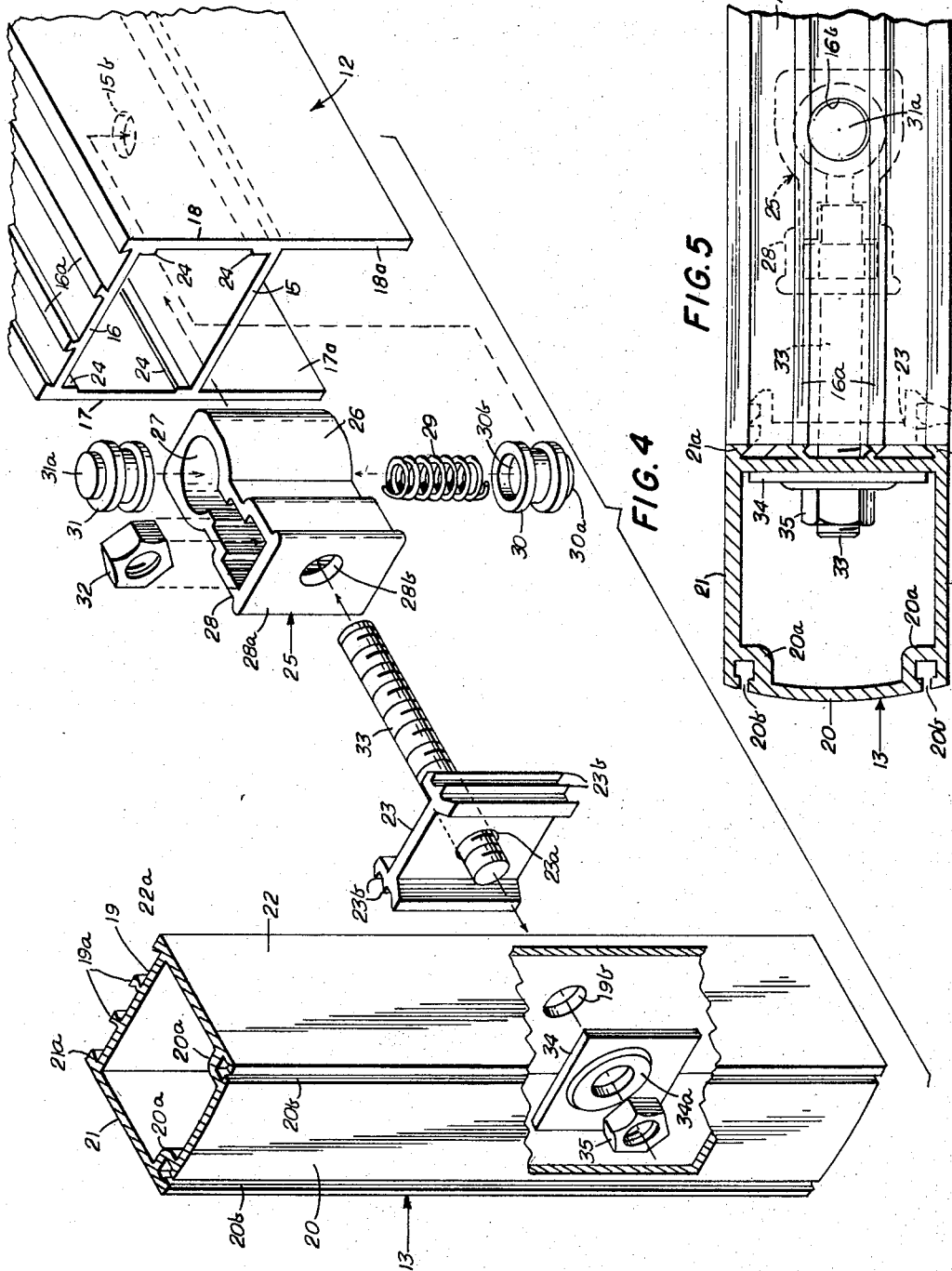

United States Patent Office 3,375,030
Patented Mar. 26, 1968

3,375,030
JOINT CONSTRUCTION FOR DOORS,
WINDOWS AND THE LIKE
Alex S. Thompson, Irving, Tex., assignor to Southern Extrusions, Inc., Magnolia, Ark., a corporation of Arkansas
Filed Nov. 6, 1964, Ser. No. 409,401
11 Claims. (Cl. 287—189.36)

This invention is directed to improvements in construction for joining two frame members in rigid angular relation.

The existing techniques used in construction for joining two frame members in rigid angular position may be classed as cast, welded, long rod and screw boss securement. The cast construction for joining two members rigdly in angular relationship in field use requires special skills and tools.

The welded joint, especially a corner joint, results in a tempered joint. The metal forming of doors and the like must be carried out at a special shop and the joint cannot be adjusted in the field. Such welded joints do not have high strength characteristics.

In using the long rod, cutting and fitting is required in the field. In the screw boss arrangement for joints there is required retapping and fitting which is not subject to quick field adaptation.

It is therefore an object of this invention to provide a construction for joining together two frame members in rigid angular relation that is not only stronger than other types of joint construction but is more easily adaptable in the field with ordinary tools.

A further object of the invention is to provide in a corner joint for a door or the like having a rail at the top and bottom and a stile with two parallel side walls, a pivoted fitting in the rail to which a stud is attached that leads through a stabilizer plate between abutting end of the rail and side of a stile with the stud secured in the stile so that a uniform pull is obtained in the walls of the stile in their abutment against the end of the rail.

A still further object of the invention is to provide a pivoted corner block assembly for securing a tensioning stud for a joint that has two angularly disposed box section frame members wherein a housing having a bore receives a compression spring and bushings in each end that are forced into apertures in the walls of one of the frame members.

Yet a further object of the invention is to provide a securing means for holding two box section frame members together comprising a pivoted housing in one frame member having a stud leading therefrom and passing through a stabilizing block that projects between and into portions of the two abutting frame members and is provided with securing and tensioning means.

For a more complete understanding of the nature and scope of this invention reference is had to the drawings in which;

FIG. 1 is an elevational view of a door having bottom and top rails and stiles at the sides joined together at the corners by connecting means according to the invention;

FIG. 2 is a fragmentary showing of the corner joint construction of FIG. 1 on an enlarged scale;

FIG. 3 is a sectional view along line 3—3 of FIG. 2 on a still further enlarged scale showing the fastening means for the joint;

FIG. 4 is an exploded view of the apparatus of the joint shown in the lower left hand corner of FIG. 1; and FIG. 5 is a sectional view along line 5—5 of FIG. 2 depicting the fastening means of the joint on an enlarged scale.

Throughout the description like reference numbers refer to similar parts.

A door 10 is typically shown in FIG. 1 and is made up of top and bottom rails 11 and 12 and left and right stiles 13 and 14.

The stiles 13 and 14 have a box cross section and as are most of the parts made of suitable aluminum alloy. They are called a first frame member or rail 13 and a second frame member or stile 12 for the corner joint, typically shown in the lower left hand corner of FIG. 1. The rail 12 shown has an inner web wall 15, an outer web wall 16 and oppositely disposed side walls 17 and 18 to make up the box section which may be substantially square in cross section as here illustrated. In the rail 12, the side walls project at 17a and 18a down beyond the inner web wall 15. The top web wall 16 is formed with grooved ribs 16a which form dove-tial grooves therebetween.

The stile 13, as well as the stile 14, has a square cross section or box section and has an inner web wall 19, and outer web wall 20 and side walls 21 and 22. The side walls 21 and 22 project beyond the inner web wall at 21a and 22a which has ribs 19a. Thus, there is a recess formed between the projecting side walls to receive a portion of a stabilizer member to be described. The outer web wall 20 may be formed with fillets 20a at its corners having grooves 20b exposed in the outside face thereof.

The inner web wall 19 has an aperture 19b therein to receive a securing stud, to be described.

The two members 12 and 13 abut each other as shown in FIG. 5 and are held together by securing means, to be described, so that the wall portions 21a and 22a of the stile abuts tightly against the ends of walls 17 and 18 of the rail 12.

A stabilizer member 23 of I-shaped cross section has a central web that has an aperture 23a therethrough and the end flanges have projecting ribs 23b of V-shaped projecting cross section. A portion of this stabilizer 23 is slidingly received in the recess formed between the projecting walls 21a and 22a of stile 13 adjacent the inner web wall 19 in a dove-tail fit. The other portion of the stabilizer 23 projects into the adjacent open end of rail 12 preferably with a drive fit.

The walls 17 and 18 of the rail 12 have at their inner corners inwardly projecting bosses 24 and the ribs 23b of the stabilizer ride against these bosses. The height of the stabilizer is such as to extend between the inner and outer web walls 15 and 16.

A corner block assembly is generally indicated at 25. The inner and outer web walls of the rail 12 have apertures 15b and 16b which serve as pivots for the corner block assembly 25, as will be described. A housing 26 has a length equal to the distance between the web walls 15 and 16 and has a bore 27 extending from its top to its bottom and a formed hollow appendage 28 that has a face plate portion 28a which is apertured at 28b.

The bore 27 of the housing 26 receives a compression spring 29 and a bottom and a top bushing 30 and 31, each of which has a reduced end portion 30a and 31a, received respectively in the apertures 15b and 16b in the adjacent web walls whereby a pivot axis is provided for the corner block assembly 25. The bushings 30 and 31 are formed with end pockets 30b and 31b (not shown) to receive and house the ends of spring 29.

Within the hollow appendage 28 there is slidingly received a hexagonal steel nut 32 that is held from turning by the interior adjacent side walls of the appendage 28. This nut 32 is positioned in line with the aperture 28b and threadedly receives an end of a threaded steel stud 33 which projects at right angles to the bore 27 of housing 26, out through the end of rail 12, through the aperture 23a in stabilizer 23 and on through the aperture 19b in the inner web 19 of the stile 13. Within the stile 13 is placed a steel air-craft type expansion washer 34 and it is received over the adjacent end of stud 33. The washer 34 has a dimpled portion 34a that is suitable to lock a tightening nut 35 received on the adjacent protruding end of stud 33. The dimpled portion 34a of the washer will compress and function as a locking device.

The corner block assembly 25 has a width materially less than the space between the side walls 17 and 18 of the rail 12 and thus may pivot to adjust itself.

These knock-down type of doors lend themselves to be installed easily in the field where they can be sized and assembled on the job. They can be assembled and adjusted with small hand tools and yet achieve maximum load capabilities. The overall door size may be altered in the field without sacrificing the strength and appearance of a shop or factory assembled unit.

As each door corner is tightened by setting upon nut 35 on threaded stud 33, this design of corner block assembly enables the block assembly to adjustably pivot thereby converting the load to the center of the bushings.

When the torque is increased to achieve the maximum load capabilities, the aluminum bushings 30 and 31 become a part of the door rail 12. After a door according to this invention has been installed it is continuously subjected to stress when forced past the maximum opening position. The expansion washer 34 will continue to compress under these conditions and return to its original form as the stress decreases.

Proper alignment of the bottom rail with the stile at the joints to achieve a flush joint is accomplished with the stabilizer blocks 23. Each block is a slide fit into the recess formed into the door stile 13 and a snug drive fit inside the opening in the rails 11 and 12. When the joint is tightened the stabilizer block 23 will align the outside surfaces of the top and bottom rails, 11 and 12, with the door stiles 13 and 14 to achieve a flush joint. Forces applied to the top and bottom door rails after assembly are transmitted to the inner web wall of the door stile and eliminate twisting at the corners.

In the operation of welded corner joints in a door when there is minor stress, the connection at the joint will open but cannot return to a normal position. If there is extreme stress in the areas of the door sections which have received additional tempering due to welding, these joints will tear and cause a complete corner failure. Contrasted with this, in the joint according to this invention, under minor stress the joint returns to its normal condition. Under extreme stress conditions the joint according to this invention may be field corrected by a simple adjustment of the corner block assembly.

I claim as my invention:

1. A construction for joining two frame members in rigid angular relation comprising, in combination, a first frame member having a box section wtih an inside web wall, an outisde web wall and spaced side walls, said inside web wall having a stud receiving aperture therethrough, said spaced side walls projecting in spaced relation outward of said inside web thereby leaving a recess in said first frame member, a second frame member having a box section with an inside web wall, an outside web wall and spaced side walls for abutting contact with the respective side walls of the first frame member, said web walls of the second frame member having apertures therethrough for receiving bushing members therein, a block assembly received in said second frame member box section and having a housing member narrower than the distance between said side walls and having a bore therethrough, a compression spring in the bore and a bushing in each end of the bore received in said apertures in the web walls of the second frame member as the compression spring urges said bushings outwardly of the housing thereby positioning sad housing member for pivotal movement, said housing having means for securing a stud thereto; a stud received in said securing means and projecting outward of said box section for reception by said aperture in the first frame member; an apertured stabilizer block slidably received over said stud and having a portion received in said recess in the first frame member between said projecting side walls and a portion received in said box section of the second frame member whereby the end of the second frame member is closed, said second frame member on receiving the bushings in the apertures in its webs being totally closed by its webs and side walls; and means received on said stud within the box section of the first frame member and applying tightening pressure between the stud and the inside face of the inside web of said member for securing said frame members in aligned abutting rigid angular relation.

2. Apparatus according to claim 1 wherein said housing member has a height in the direction of its bore that is just slightly less than the distance between said inside and outside web walls.

3. Apparatus according to claim 1 wherein said stabilizing member substantially fills the cross sectional area of said box section of the second frame member and has a slightly loose fit with the recess in said first frame member.

4. An apparatus according to claim 1 wherein said second frame member has its side walls extending beyond an adjacent web wall thereof and said extending side walls at their outer ends are in alignment with the end of the first frame member whereby a corner construction is formed.

5. An apparatus according to claim 1 wherein said projecting side walls of the first frame member have a dove-tail surface on the inside thereof and wherein said stabilizer block has side walls of dove-tail complementary shape to said side walls of the recess of the first frame member between which they are slidingly received.

6. An apparatus according to claim 5 wherein said second frame member has a slightly protruding boss portion on each of its side walls adjacent said inner and outer web walls.

7. An apparatus according to claim 6 wherein said stabilizer block has side ribs thereon for abutting said protruding boss portions on the side walls of said second frame member.

8. A construction for joining two frame members in rigid angular relation comprising, in combination, a first frame member having two spaced apart side walls thereof each projecting beyond an adjacent wall therebetween to form a recess, said adjacent wall having a stud receiving aperture therethrough; a second frame member having a box section with a pair of spaced apart web walls and a pair of spaced apart side walls, said side walls being in alignment with and for abutting contact with said projecting side walls of the first frame member, said web walls of the second frame member having apertures therein for receiving bushing members therein, a block assembly received in said second frame member box section and having a housing member narrower than the spacing between said side walls and having a bore therethrough, a compression means in the bore and a bushing in each end of the bore received in said apertures in the web walls of the second frame member as the compression means urges said bushings outwardly of the housing thereby positioning said housing member for pivotal movement, said housing member having a stud secured thereto and projecting therefrom outwardly of the second frame assembly for reception by said stud receiving aperture in the first frame member; an apertured stabilizer block received over said stud and having a portion received in said recess in the first frame member between said projecting side walls and a portion received in said box section of the second frame member whereby the end of the second frame member is closed and said first and second frame members are adjustably positioned for abutting relation and with their side walls in alignment; said second frame member on receiving the bushings in the apertures in its webs being totally closed by its webs and side walls; and means for tightening up on said stud in the first frame member thereby applying pressure between the stud and the inside face of the inside web of the first member to pull said first and second frame members into said rigid angular relation.

9. A construction according to claim 8 wherein said projecting side walls of the first frame member have a dovetail surface on the inside thereof and wherein said stabilizer block has side walls of dove-tail complementary shape to said side walls of the recess of the first frame member between which they are slidingly received.

10. A construction according to claim 9 wherein said second frame member has a slightly protruding boss portion on each of its side walls adjacent said inner and outer web walls.

11. A construction according to claim 10 wherein said stabilizer block has side ribs thereon for abutting said protruding boss portions on the side walls of said second frame member.

References Cited

UNITED STATES PATENTS

| 2,611,633 | 9/1952 | Webster | 287—54 |
| 3,061,055 | 10/1962 | Nijhuis | 287—189.36 |
| 3,245,232 | 4/1966 | Adler | 16—176 |

FRANK L. ABBOTT, *Primary Examiner.*

RICHARD W. COOKE, HENRY C. SUTHERLAND,
*Examiners.*

CHARLES G. MUELLER, *Assistant Examiner.*